US012754984B2

(12) United States Patent
Hablert et al.

(10) Patent No.: US 12,754,984 B2
(45) Date of Patent: Oct. 6, 2026

(54) ROLE-BASED ACCESS CONTROL FOR GENERATIVE ARTIFICIAL INTELLIGENCE

(71) Applicant: INTUIT INC., Mountain View, CA (US)

(72) Inventors: Idan Habler, Tel Aviv (IL); Ron Bitton, Tel Aviv (IL); Tsofit Efroni Zazon, Tel Aviv (IL); Yael Mathov Gome, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 39 days.

(21) Appl. No.: 19/056,097

(22) Filed: Feb. 18, 2025

(65) Prior Publication Data

US 2026/0244720 A1 Aug. 20, 2026

(51) Int. Cl.
*G06F 21/31* (2013.01)

(52) U.S. Cl.
CPC .................................... *G06F 21/31* (2013.01)

(58) Field of Classification Search
CPC ........................................................ G06F 21/31
See application file for complete search history.

(56) References Cited

U.S. PATENT DOCUMENTS

| | | | | |
|---|---|---|---|---|
| 10,217,464 | B2 * | 2/2019 | Van Wissen | G10L 15/22 |
| 12,438,917 | B1 * | 10/2025 | Ananthakrishnan | H04L 63/20 |
| 12,457,239 | B1 * | 10/2025 | Mantin | H04L 63/1466 |
| 12,561,374 | B1 * | 2/2026 | Tam | G06F 16/33295 |
| 2025/0310336 | A1 * | 10/2025 | Medina | H04L 63/20 |
| 2025/0371054 | A1 * | 12/2025 | McCurdy | G06F 16/3344 |
| 2025/0371263 | A1 * | 12/2025 | Rothschild | G06F 40/20 |
| 2026/0030270 | A1 * | 1/2026 | Pall | G06F 16/3329 |
| 2026/0067113 | A1 * | 3/2026 | Brenna | G06F 16/33295 |

OTHER PUBLICATIONS

Vestal, “RAG & RBAC integration: Protect data and boost AI capabilities”, https://www.elastic.co/search-labs/blog/rag-and-rbac-integration, May 8, 2024, 17 pages.

* cited by examiner

*Primary Examiner* — Viral S Lakhia
(74) *Attorney, Agent, or Firm* — DLA PIPER LLP US

(57) ABSTRACT

At least one processor may receive a user prompt from a user and determine a user role associated with the user. The at least one processor may select a system prompt associated with the user role and identify at least one data source from among a plurality of available system prompts each associated with a different respective user role and indicating one or more data sources accessible according to the respective user role. The at least one processor may build a final prompt configured to retrieve data responsive to the user prompt from the at least one data source. The at least one processor may query a generative artificial intelligence (GenAI) system using the final prompt, the querying causing the GenAI system to access the at least one data source identified by the system prompt and provide a response incorporating data obtained from the at least one data source.

18 Claims, 6 Drawing Sheets

ROLE-BASED ACCESS CONTROL FOR GENERATIVE ARTIFICIAL INTELLIGENCE

BACKGROUND

The rapid advancement and deployment of generative artificial intelligence (GenAI) systems such as large language models (LLMs) in various applications have highlighted the need for sophisticated data access control mechanisms to ensure data security and integrity. For example, GenAI applications sometimes access external tools (e.g., database query, web search, etc.) to augment the data available to them to respond to user queries. This can ensure the GenAI has relevant, up-to-date information, but can also create access control problems. For example, different users may have different permissions to access different data sets. The data sources themselves can provide access control, but this approach is static with respect to the GenAI system, and does not allow the GenAI system to dynamically adjust access control and functionality restrictions to varied data sources, user roles, and operational contexts. Moreover, when multiple data sources are involved, a high degree of variability and inconsistency is introduced when access control is managed by individual data sources separately.

BRIEF DESCRIPTIONS OF THE DRAWINGS

DETAILED DESCRIPTION OF SEVERAL EMBODIMENTS

Systems and methods described herein provide role based access control (RBAC) for retrieval augmented generation (RAG) data sources through automatic, secure modification of internal GenAI (e.g., LLM) system prompts. System prompts can include instructions and/or contextual information provided to an LLM to guide how the LLM interprets and responds to user queries. System prompts can be tailored for use cases to cause the LLM to operate within specific parameters and generate responses that are coherent and/or relevant to a given use case. Systems and methods described herein can go beyond tailoring system prompts to use cases by dynamically incorporating access control information within system prompts so that the instructions to the LLM prevent the LLM from accessing and/or returning information that should not be returned to the user. Disclosed embodiments can provide a framework that integrates LLM agents with RBAC systems to enhance the capabilities of GenAI applications while ensuring data security. This framework can leverage RBAC to enforce meticulous control over sensitive data access, thereby maintaining data integrity and confidentiality. Each user in the framework can access different sources of information, various types of databases, different prompts, and/or different agents based on assigned roles. Accordingly, the systems and methods described herein can provide a technical solution to the problem of centralized data access control for LLM queries by adding processing layer(s) and/or step(s) to otherwise standard processing of LLM system prompts.

Figure 1:
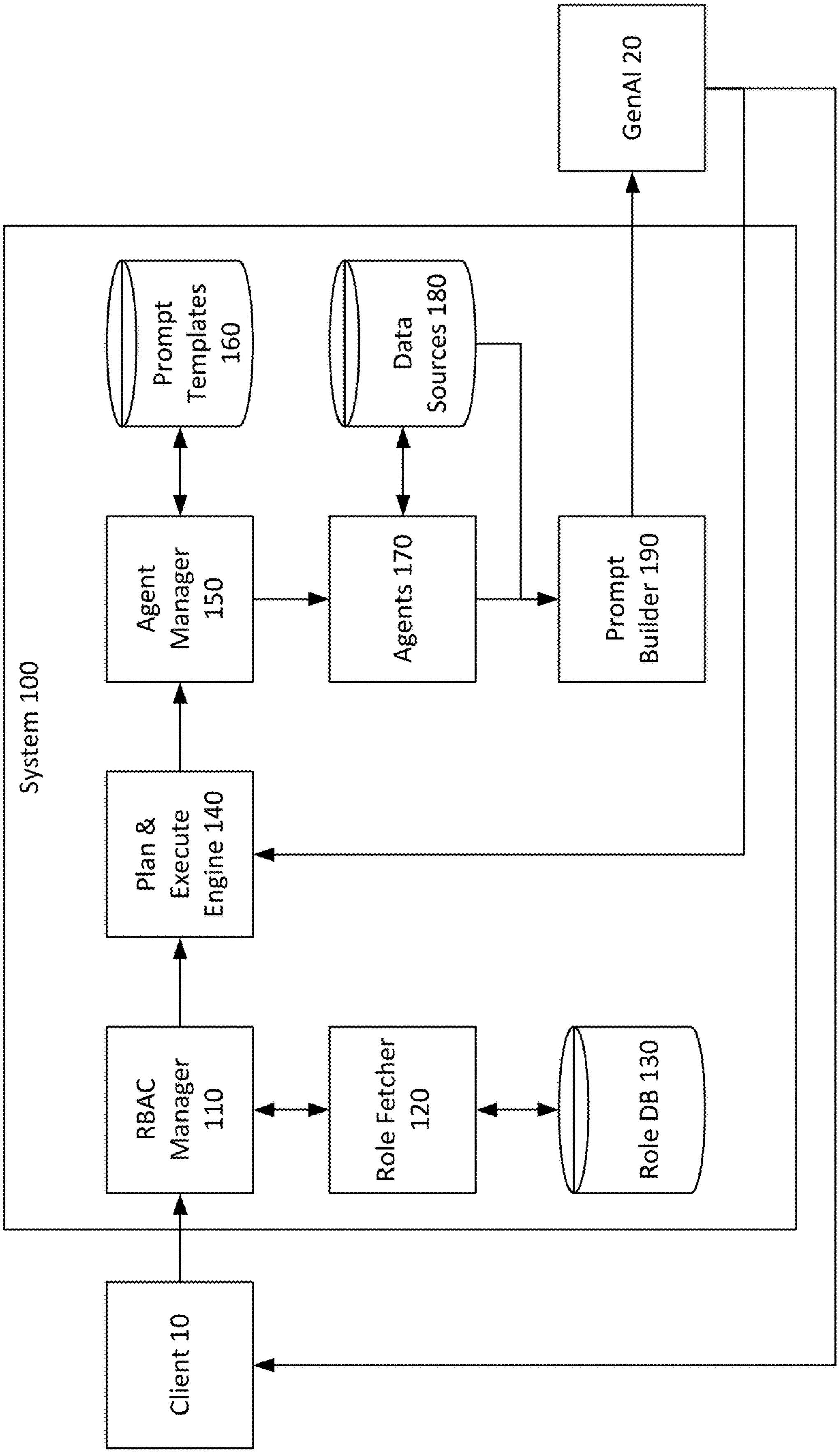
FIG. 1 shows an example role based access control system according to some embodiments of the disclosure.

FIG. 1 shows an example role based access control system 100 according to some embodiments of the disclosure. System 100 may include RBAC manager 110, role fetcher 120, role database (DB) 130, plan and execute engine 140, agent manager 150, prompt templates DB 160, agents 170, data sources 180, and/or prompt builder 190, the features and functions of which are described in detail below. As described in detail below, system 100 may interact with client 10 to obtain and process user prompts and/or with GenAI 20 to obtain responses to processed user prompts (e.g., with RBAC added data), for example.

Illustrated components may include a variety of hardware, firmware, and/or software components that interact with one another. Some components shown in FIG. 1 may communicate with one another using networks. For example, client 10 may access system 100 through one or more networks (e.g., the Internet, an intranet, and/or one or more networks that provide a cloud environment) and/or system 100 may communicate with GenAI 20 through the one or more networks. In some embodiments, elements of system 100 may communicate with one another through the one or more networks. Each component may be implemented by one or more computers (e.g., as described below with respect to FIG. 6).

The elements of system 100 are described in greater detail below with respect to FIGS. 2-5, but in general, system 100 can determine a role for a user generating a prompt, determine appropriate system prompt templates and/or agent context data for the user based on the role, and build a final prompt for GenAI 20 that incorporates the system prompt templates and/or agent context data. By performing this processing, system 100 can provide secure, central RBAC that can safeguard against GenAI 20 providing data to a user that the user is not permitted to access, all without requiring user validation or other access control processing locally at any data sources accessed by GenAI 20.

Elements illustrated in FIG. 1 (e.g., system 100 (including RBAC manager 110, role fetcher 120, role database (DB) 130, plan and execute engine 140, agent manager 150, prompt templates DB 160, agents 170, data sources 180, and/or prompt builder 190), client 10, and GenAI 20) are each depicted as single blocks for ease of illustration, but those of ordinary skill in the art will appreciate that these may be embodied in different forms for different implementations. For example, while separate modules of system 100 are depicted separately, any combination of these elements may be part of a combined hardware, firmware, and/or software element. Moreover, while the modules are depicted as parts of a single system 100 element, any combination of these elements may be distributed among multiple logical and/or physical locations. Also, while one client 10, one GenAI 20, and one system 100 with one RBAC manager 110, one role fetcher 120, one role database (DB) 130, one plan and execute engine 140, one agent manager 150, one prompt templates DB 160, one agents module 170, one data sources DB 180, and one prompt builder 190 are illustrated, this is for clarity only, and multiples of any of the above elements may be present. In practice, there may be single instances or multiples of any of the illustrated elements, and/or these elements may be combined or co-located. For example, system 100 may interact with multiple clients 10 and/or GenAIs 20.

In the following descriptions of how the illustrated components function, several examples are presented. However, those of ordinary skill in the art will appreciate that these examples are merely for illustration, and the disclosed embodiments are extendable to other contexts and/or scenarios.

Figure 2:
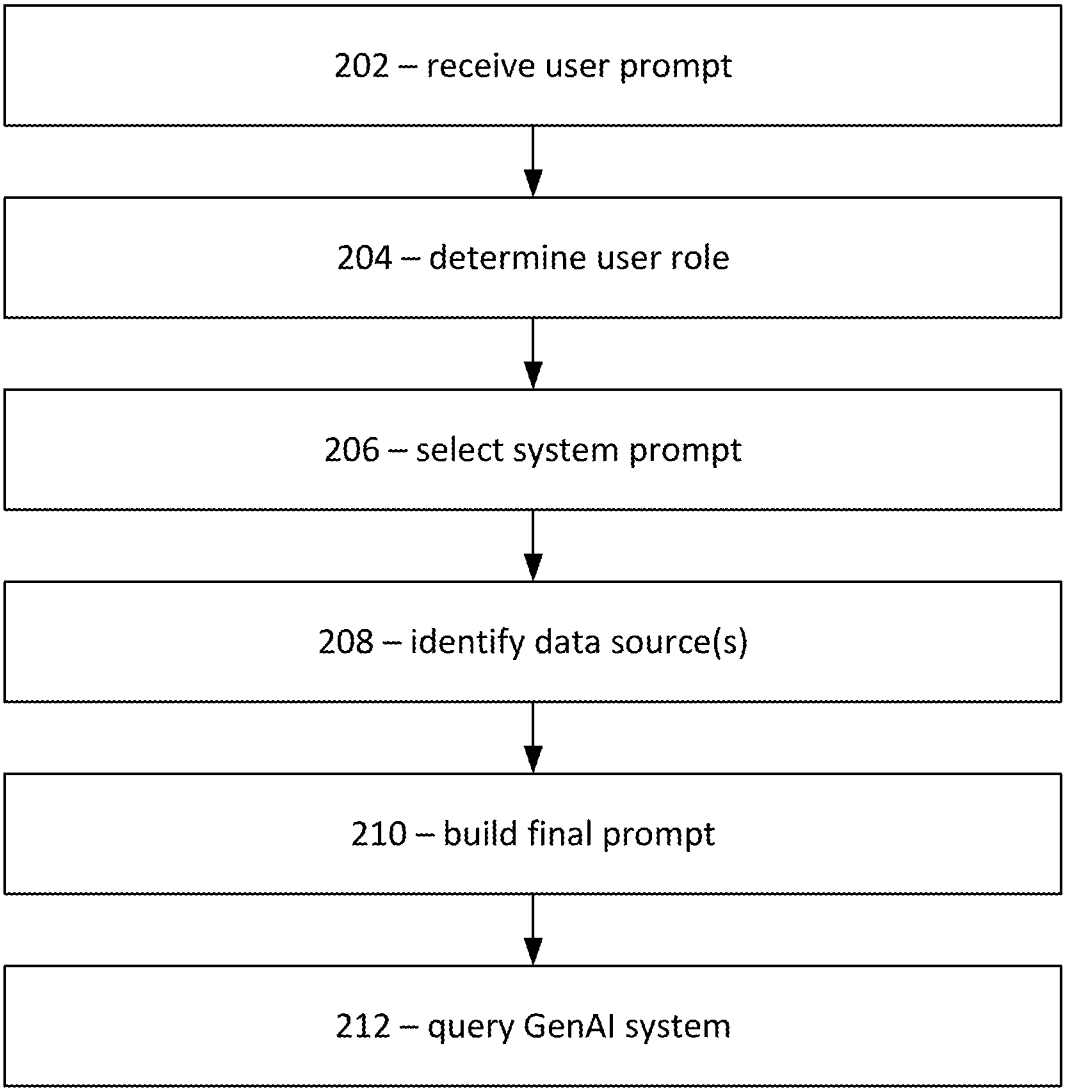
FIG. 2 shows an example role based access control process according to some embodiments of the disclosure.

FIG. 2 shows an example role based access control process 200 according to some embodiments of the disclosure. For example, system 100 can perform process 200 when a user of client 10 enters a user prompt into a user interface intending to receive a response to the user prompt from GenAI 20. System 100 can process the user prompt prior to querying GenAI 20, thereby providing role based access control.

At 202, RBAC manager 110 can receive a user prompt from a user. For example, a user can interact with a user interface (UI) presented by client 10. The UI can include a field, chat interface, or other feature through which the user can enter a query as a user prompt. For example, the query can be a natural language query intended for an LLM to answer. Client 10 can send the user prompt to RBAC manager 110. In at least some embodiments, the user prompt can include and/or be sent with additional data beyond the user's plain language query. For example, client 10 can include data indicating context information such as an app or portion thereof in which the UI is being presented.

At 204, RBAC manager 110 and/or role fetcher 120 can determine a user role associated with the user. By determining the user's role, RBAC manager 110 and/or role fetcher 120 can enable subsequent processing to allow and/or deny access to data on a per-user basis according to role. As a non-limiting example, user roles can include roles such as admin, data analyst, customer support representative, etc. It can be appreciated that different roles may be assigned to a variety of specific access privileges and interaction capabilities that may differ widely by role. Permissions may vary in granularity, for example granting permission to access entire databases, or granting permission to access specific data fields or types within databases also including restricted data. In some embodiments, roles can be defined based on other attributes (e.g., types of accounts such as unauthenticated accounts, new accounts, dormant accounts, etc.), in addition to or instead of per role title. An example role determination process 300 that may be performed at 204 is described in detail below with respect to FIG. 3.

At 206, plan and execute engine 140 and/or agent manager 150 can select a system prompt associated with the user role from among a plurality of available system prompts. Each respective available system prompt may be associated with a different respective user role in some embodiments. For example, prompt template DB 160 may store multiple system prompt templates. Each template may be tagged with and/or otherwise associated with information identifying one or more user roles. Plan and execute engine 140 and/or agent manager 150 can search prompt template DB 160 for the user role identified at 204. In some embodiments, plan and execute engine 140 can select an agent manager 150, or set of options therein, associated with the user role identified at 204 from among a plurality of available agent managers 150 or options, and the selected and/or configured agent manager 150 can retrieve the prompt(s) within prompt template DB 160 to which it has access. Different system prompts can include different instructions so that GenAI 20 can process the user prompt differently depending on user role. For example, system prompt templates can include explicit instructions to avoid accessing certain data for certain roles, can instruct GenAI 20 to always access a data source for a given role, etc.

As specific, non-limiting examples of prompt templates, the following three prompts may be used for different members of a human resources (HR) team as follows:

1. HR Manager System Prompt:
   "You are an AI assistant, providing help to HR Managers. You can answer questions regarding employee personal data, payroll details, performance evaluations, and disciplinary records using the following datasources: Employee Database, Payroll System, and Performance Review System. Your available agents are: viewPersonalData, editPersonalData, viewPayrollDetails, editPayrollDetails, viewPerformanceEvaluations, editPerformanceEvaluations, viewDisciplinaryRecords, and editDisciplinaryRecords."
2. Hiring Manager System Prompt:
   "You are an AI assistant, providing help to Hiring Managers. You can answer questions regarding candidate resumes, interview notes, and job application statuses using the following datasources: Applicant Tracking System, Interview Feedback System, and Job Postings Database. Your available function calls are: viewResumes, viewInterviewNotes, viewJobApplicationStatus, and updateJobApplicationStatus."
3. Department Supervisor System Prompt:
   "You are an AI assistant, providing help to Department Supervisors. You can answer questions regarding employee attendance records, current projects, and performance summaries using the following datasources: Attendance System, Project Management System, and Performance Summary Database. Your available agentsare: viewAttendanceRecords, viewCurrentProjects, and viewPerformanceSummaries."

At 208, agents module 170 can identify data source(s) 180 providing context. For example, each respective available system prompt may indicate one or more data sources 180 accessible according to the respective user role such that data sources 180 not indicated in the respective system prompt are inaccessible to the respective user role. Agents module 170 can select the same data source(s) 180 indicated as accessible within the system prompt identified at 206. Agents module 170 can communicate with the one or more data sources 180, for example through one or more APIs provided by the one or more data sources 180. Opening such communication can allow building of the final prompt, as described below.

At 210, prompt builder 190 can build a final prompt. The final prompt may be configured to retrieve data responsive to the user prompt from the at least one data source 180. The final prompt may include the system prompt and at least a portion of the user prompt. In at least some embodiments, prompt builder 190 can retrieve contextual data from the one or more data sources 180 connected with at 208 and incorporate the contextual data into the final prompt. An example prompt building process 400 that may be performed at 206-210 is described in detail below with respect to FIG. 4.

As a specific, non-limiting example, the following may be a final prompt for the HR example presented above:

"You are an AI assistant, providing help to HR Managers. You can answer questions regarding employee personal data, payroll details, performance evaluations, and disciplinary records using the following datasources: Employee Database, Payroll System, and Performance Review System. Your available agents are:

viewPersonalData, editPersonalData, viewPayrollDetails, editPayrollDetails, viewPerformanceEvaluations, editPerformanceEvaluations, viewDisciplinaryRecords, and editDisciplinaryRecords.

#user input:

User_input: {What is the salary of employee #1234}

#Tools and agents response:

viewPayrollDetails: {Using the Payroll system I was able to find that employee #1234 salary is 100$ a day}."

At 212, system 100 can query GenAI 20 using the final prompt. The querying may cause GenAI 20 to access the at least one data source 180 identified by the system prompt and provide a response incorporating data obtained from the at least one data source 180 in some embodiments. As described in detail below, the response may either be sent back to client 10 or may trigger further processing (e.g., a repetition of processing at 206-212) depending on the content of the response. An example querying process 500 that may be performed at 212 is described in detail below with respect to FIG. 5.

As a specific, non-limiting example of a response by GenAI 20 in the HR example context, GenAI 20 may reply to the above final prompt example with "Employee #1234 salary is 100 dollars a day."

Figure 3:
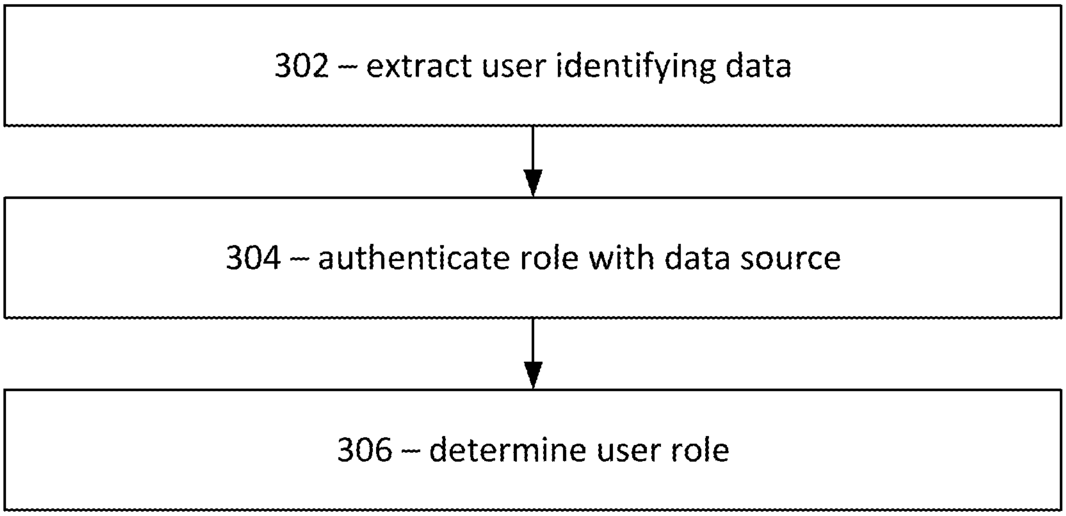
FIG. 3 shows an example role determination process according to some embodiments of the disclosure.

FIG. 3 shows an example role determination process 300 according to some embodiments of the disclosure. System 100 can perform process 300 to determine the role of a user submitting a user prompt for processing by GenAI 20. By performing process 300, system 100 can identify the information needed to build a final prompt for the GenAI 20 that controls GenAI 20 access to and furnishing of data in accordance with the user role. This centralizes data access control. As noted above, in some embodiments system 100 can perform process 300 at 204 while performing process 200.

At 302, RBAC manager 110 can extract user identifying data. For example, RBAC manager 110 can extract a unique user identifier from at least one of a message including the user prompt and an application session in which the user prompt was generated. For example, identifiers can include, but are not limited to, user name and/or password, unique user identifier within an application in which the user entered the prompt, data contained in cookies on client 10, etc. In some embodiments, RBAC manager 110 can also determine an application or other context associated with the user prompt. For example, depending on whether the user prompt was entered in a tax interface, an accounting interface, an invoicing interface, or any other interface, different system prompts may apply. Accordingly, RBAC manager 110 can indicate within and/or alongside the user identifying data a context for the user prompt.

At 304, role fetcher 120 can authenticate the user role as being associated with the unique user identifier from 302 with role DB 130, which may function as at least one user role data source. For example, role fetcher 120 can search role DB 130 for a prompt matching and/or related to the unique user identifier In at least some embodiments, role fetcher 120 can select a specific role DB 130 from among a plurality of databases, and/or can select a portion of role DB 130, to search according to the context as determined at 302.

At 306, role fetcher 120 can determine the user role. For example, role fetcher 120 can select a closest-matching user role from role DB 130 as the user role.

Figure 4:
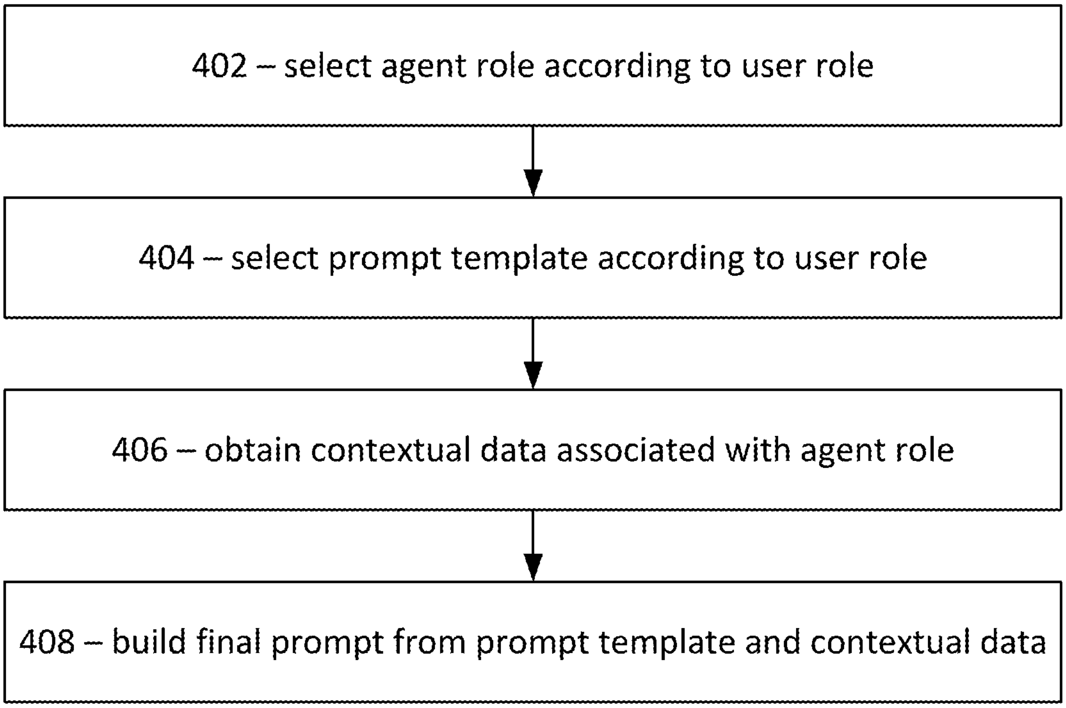
FIG. 4 shows an example prompt building process according to some embodiments of the disclosure.

FIG. 4 shows an example prompt building process 400 according to some embodiments of the disclosure. System 100 can perform process 400 to build a final prompt controlling data access by GenAI 20. By performing process 400, system 100 can provide centralized, efficient role based access control without requiring access control by GenAI 20 itself or any data sources used by GenAI 20. As noted above, in some embodiments system 100 can perform process 400 at 206-210 while performing process 200.

At 402, plan and execute engine 140 can select an appropriate agent manager 150 and/or agent manager 150 options for the user role. For example, plan and execute engine 140 can use the user prompt and the user role to determine an agent that is compatible with both. For example, continuing the HR example presented above, an agent could be "viewPayrollDetails" agent that may be responsible for accessing the payroll system, and the agent's manager can share access to this data only for an "HR Manager" role.

At 404, agent manager 150 can select the appropriate prompt template for the user role from prompt template DB 160. By selecting a prompt template for the specific user role, a final prompt may be built with authorized templates only, limiting the user functionalities and tools to only those that are authorized for the role.

At 406, agent module 170 can obtain contextual data associated with the user role from data source(s) 180. Based on the user role, agent module 170 may provide access to authorized agent data only, thus accessing authorized functionalities and authorized data sources. System 100 may support integration with various data sources (e.g., SQL/NoSQL databases, cloud storage, APIs, etc.), ensuring that data access requests by LLM agents are validated against the user's role and permissions for any data source type.

At 408, prompt builder 190 can build a final prompt from the prompt template and contextual data. Prompt builder 190 can combine the data obtained at 406, the system prompt template obtained at 404, and the user prompt into a final prompt.

Figure 5:
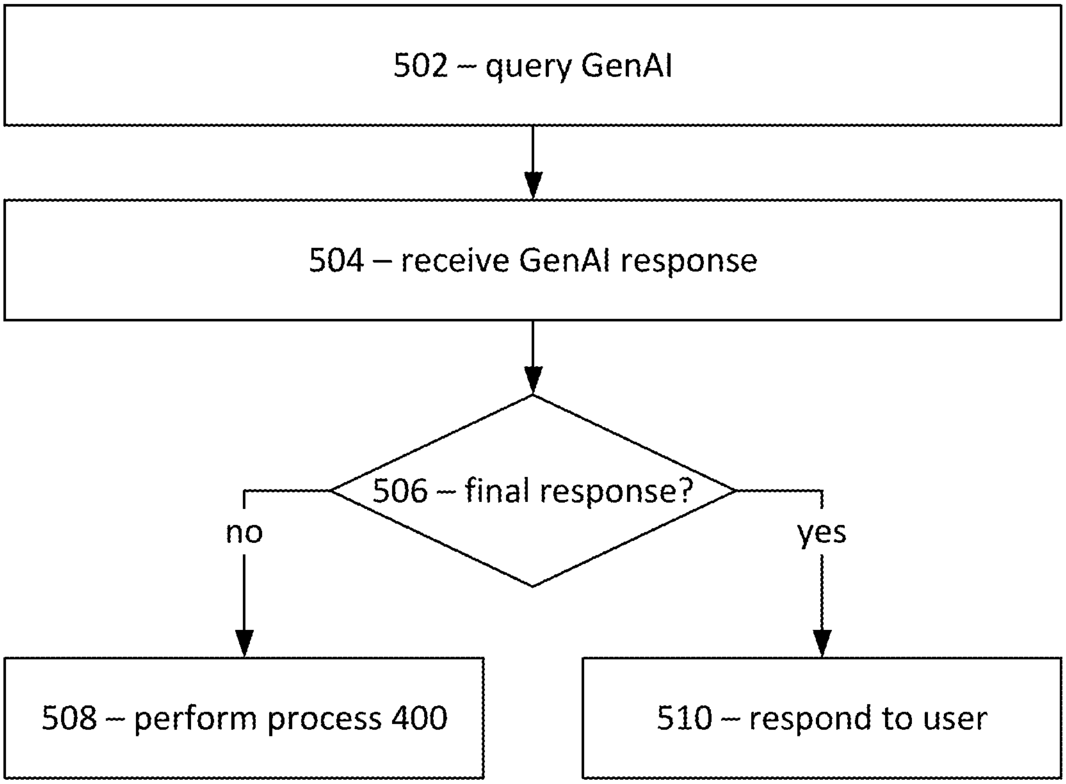
FIG. 5 shows an example querying process according to some embodiments of the disclosure.

FIG. 5 shows an example querying process 500 according to some embodiments of the disclosure. System 100 can perform process 500 to query GenAI 20 with the final prompt and handle GenAI 20 responses. As noted above, in some embodiments system 100 can perform process 500 at 212 while performing process 200.

At 502, system 100 can send the final prompt built by prompt builder 190 to GenAI 20. For example, system 100 can send the final prompt using any API or interface specified by GenAI 20, as appreciated by those of ordinary skill in the art. In response to receiving the final prompt, GenAI 20 can generate a response to the final prompt according to its own known or proprietary processing. At 504, system 100 can receive a response to the final prompt from GenAI 20.

At 506, system 100 can determine whether the response received at 504 is a final response. For example, system 100 can identify data or metadata in the response indicating the response is final, which may be formatted and located in a standard manner according to the GenAI 20 model used, as those of ordinary skill in the art will appreciate. If the response is not final, at 508, system can repeat process 400 as described above (in some embodiments, starting after the beginning of process 400, such as at 404 given that agent selection may not need to change), generating a follow-up final prompt and receiving another reply. For example, system 100 can build a second final prompt configured to retrieve data responsive to the user prompt from the at least one data source, the second final prompt comprising the system prompt and at least a portion of the response, and query GenAI 20 using the second final prompt to thereby cause GenAI20 to access the at least one data source identified by the system prompt and provide a second response incorporating data obtained from the at least one data source. If the response is final, at 510, the response can go to client 10, where the response, or a portion thereof, may be displayed to a user by a UI.

Figure 6:
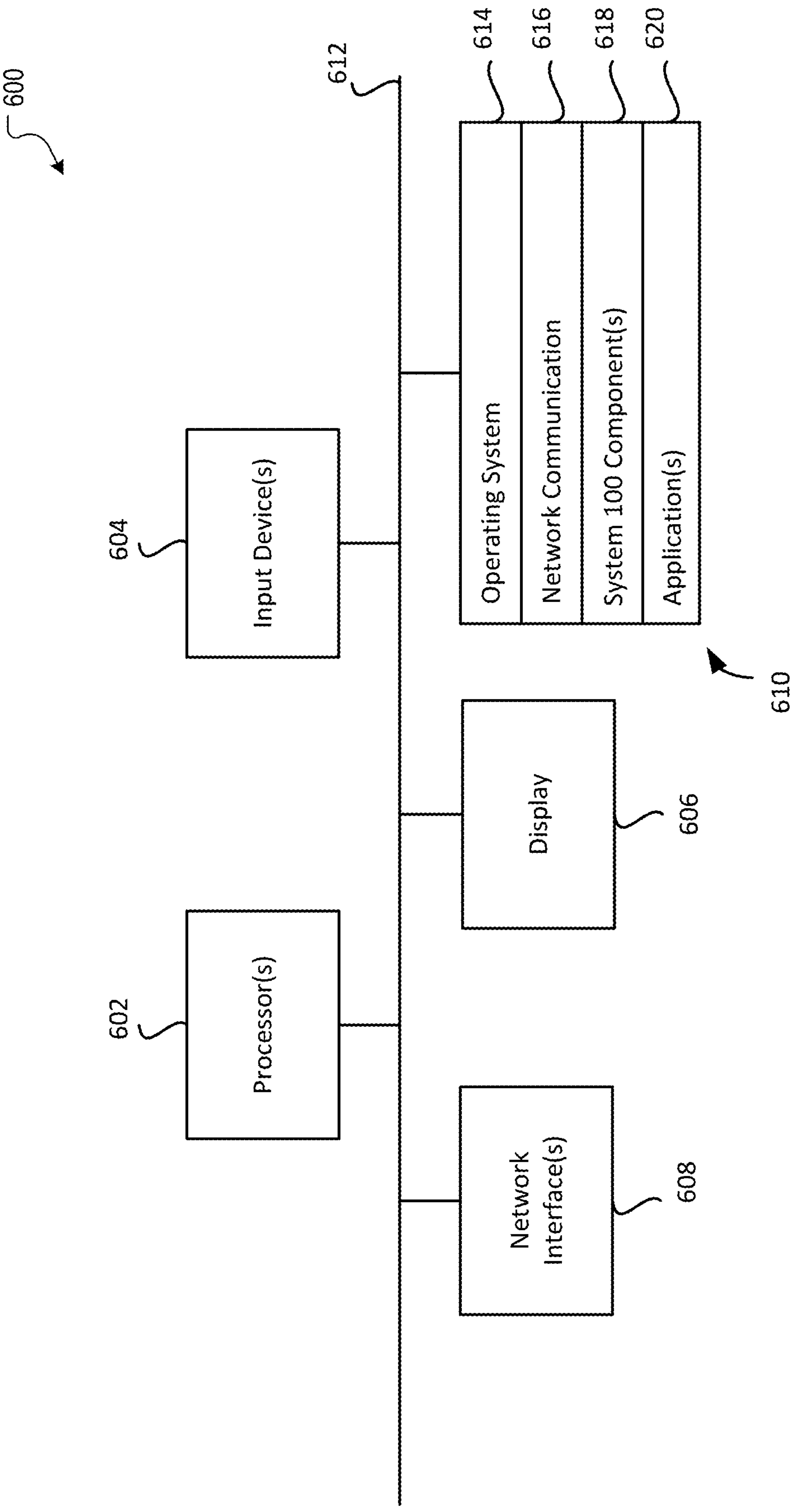
FIG. 6 shows an example computing device according to some embodiments of the disclosure.

FIG. 6 shows a computing device 600 according to some embodiments of the disclosure. For example, computing device 600 may function as system 100 and/or any portion (s) thereof, or multiple computing devices 600 may function as system 100 and/or any portion(s) thereof.

Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

System 100 components 618 may include instructions for performing the processing described herein. For example, system 100 components 618 may provide instructions for performing any and/or all of processes 200-500, and/or other processing as described above. Application(s) 620 may be an application that uses or implements the outcome of processes described herein and/or other processes. In some embodiments, the various processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A method comprising:

receiving, by at least one processor, a user prompt from a user;

determining, by the at least one processor, a user role associated with the user;

selecting, by the at least one processor, a system prompt associated with the user role and identifying at least one data source from among a plurality of available system prompts, each respective available system prompt being associated with a different respective user role and indicating one or more data sources accessible according to the respective user role such that data sources not indicated in the respective system prompt are inaccessible to the respective user role, the selecting comprising:

determining a prompt context from data indicating a portion of a user interface through which the user entered the user prompt, and selecting the plurality of available system prompts relevant to the prompt context from among a plurality of sets of system prompts relevant to a plurality of respective prompt contexts;

building, by the at least one processor, a final prompt configured to retrieve data responsive to the user prompt from the at least one data source, the final prompt comprising the system prompt and at least a portion of the user prompt; and querying, by the at least one processor, a generative artificial intelligence (GenAI) system using the final prompt, the querying causing the GenAI system to access the at least one data source identified by the system prompt and provide a response incorporating data obtained from the at least one data source.

2. The method of claim 1, wherein determining the user role comprises:

extracting a unique user identifier from at least one of a message including the user prompt and an application session in which the user prompt was generated; and authenticating the user role as being associated with the unique user identifier with at least one user role data source.

3. The method of claim 1, wherein selecting the system prompt comprises retrieving at least a portion of the system prompt from a prompt template database.

4. The method of claim 1, wherein selecting the system prompt comprises selecting an agent role as at least a portion of the system prompt from among a plurality of agent roles.

5. The method of claim 4, wherein building the final prompt comprises incorporating contextual data associated with the agent role into the final prompt.

6. The method of claim 1, further comprising:

determining, by the at least one processor, that the response is final; and providing, by the at least one processor, the response to the user through a user interface.

7. The method of claim 1, further comprising:

determining, by the at least one processor, that the response is non-final;

building, by the at least one processor, a second final prompt configured to retrieve data responsive to the user prompt from the at least one data source, the second final prompt comprising the system prompt and at least a portion of the response;

querying, by the at least one processor, the GenAI system using the second final prompt, the querying causing the GenAI system to access the at least one data source identified by the system prompt and provide a second response incorporating data obtained from the at least one data source.

8. A system comprising:

at least one processor; and at least one non-transitory computer readable medium storing instructions that, when executed by the at least one processor, cause the at least one processor to perform processing comprising:

receiving a user prompt from a user;

determining a user role associated with the user;

selecting a system prompt associated with the user role and identifying at least one data source from among a plurality of available system prompts, each respective available system prompt being associated with a different respective user role and indicating one or more data sources accessible according to the respective user role such that data sources not indicated in the respective system prompt are inaccessible to the respective user role, the selecting comprising:

determining a prompt context from data indicating a portion of a user interface through which the user entered the user prompt, and selecting the plurality of available system prompts relevant to the prompt context from among a plurality of sets of system prompts relevant to a plurality of respective prompt contexts;

building a final prompt configured to retrieve data responsive to the user prompt from the at least one data source, the final prompt comprising the system prompt and at least a portion of the user prompt; and querying a generative artificial intelligence (GenAI) system using the final prompt, the querying causing the GenAI system to access the at least one data source identified by the system prompt and provide a response incorporating data obtained from the at least one data source.

9. The system of claim 8, wherein determining the user role comprises:

extracting a unique user identifier from at least one of a message including the user prompt and an application session in which the user prompt was generated; and authenticating the user role as being associated with the unique user identifier with at least one user role data source.

10. The system of claim 8, wherein selecting the system prompt comprises retrieving at least a portion of the system prompt from a prompt template database.

11. The system of claim 8, wherein selecting the system prompt comprises selecting an agent role as at least a portion of the system prompt from among a plurality of agent roles.

12. The system of claim 11, wherein building the final prompt comprises incorporating contextual data associated with the agent role into the final prompt.

13. The system of claim 8, wherein the processing further comprises:

determining that the response is final; and providing the response to the user through a user interface.

14. The system of claim 8, wherein the processing further comprises:

determining that the response is non-final;

building a second final prompt configured to retrieve data responsive to the user prompt from the at least one data source, the second final prompt comprising the system prompt and at least a portion of the response;

querying the GenAI system using the second final prompt, the querying causing the GenAI system to access the at least one data source identified by the system prompt and provide a second response incorporating data obtained from the at least one data source.

15. A method comprising:

receiving, by at least one processor, a user prompt from a user;

determining, by the at least one processor, a user role associated with the user, the determining comprising:

extracting a unique user identifier from at least one of a message including the user prompt and an application session in which the user prompt was generated, and authenticating the user role as being associated with the unique user identifier with at least one user role data source;

selecting, by the at least one processor, a system prompt associated with the user role and identifying at least one data source from among a plurality of available system prompts, each respective available system prompt being associated with a different respective user role and indicating one or more data sources accessible according to the respective user role such that data sources not indicated in the respective system prompt are inaccessible to the respective user role, the selecting comprising:

determining a prompt context from data indicating a portion of a user interface through which the user entered the user prompt, selecting the plurality of available system prompts relevant to the prompt context from among a plurality of sets of system prompts relevant to a plurality of respective prompt contexts, and retrieving at least a portion of the system prompt from a prompt template database;

building, by the at least one processor, a final prompt configured to retrieve data responsive to the user prompt from the at least one data source, the final prompt comprising the system prompt and at least a portion of the user prompt; and querying, by the at least one processor, a generative artificial intelligence (GenAI) system using the final prompt, the querying causing the GenAI system to access the at least one data source identified by the system prompt and provide a response incorporating data obtained from the at least one data source.

16. The method of claim 15, wherein:

selecting the system prompt comprises selecting an agent role as at least a portion of the system prompt from among a plurality of agent roles; and building the final prompt comprises incorporating contextual data associated with the agent role into the final prompt.

17. The method of claim 15, further comprising:

determining, by the at least one processor, that the response is final; and providing, by the at least one processor, the response to the user through a user interface.

18. The method of claim 15, further comprising:

determining, by the at least one processor, that the response is non-final;

building, by the at least one processor, a second final prompt configured to retrieve data responsive to the user prompt from the at least one data source, the second final prompt comprising the system prompt and at least a portion of the response;

querying, by the at least one processor, the GenAI system using the second final prompt, the querying causing the GenAI system to access the at least one data source identified by the system prompt and provide a second response incorporating data obtained from the at least one data source.

* * * * *